US009629170B1

United States Patent
Yuan et al.

(10) Patent No.: US 9,629,170 B1
(45) Date of Patent: *Apr. 18, 2017

(54) RATE ADAPTATION IN A COMMUNICATION SYSTEM

(71) Applicant: Google Inc., Mountain View, CA (US)

(72) Inventors: Yuan Yuan, Sunnyvale, CA (US); Shuyi Chen, Urbana, IL (US); C. Philip Gossett, Mountain View, CA (US); Jeremy Thorpe, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,090

(22) Filed: Jun. 2, 2015

Related U.S. Application Data

(63) Continuation of application No. 14/048,242, filed on Oct. 8, 2013, now Pat. No. 9,077,486, which is a
(Continued)

(51) Int. Cl.
*H04W 72/08* (2009.01)
*H04W 24/08* (2009.01)
(Continued)

(52) U.S. Cl.
CPC ......... *H04W 72/082* (2013.01); *H04L 1/0002* (2013.01); *H04L 47/263* (2013.01);
(Continued)

(58) Field of Classification Search
CPC ..... H04L 1/0002; H04L 1/203; H04L 47/263; H04W 88/181; H04N 21/64769
See application file for complete search history.

(56) References Cited

U.S. PATENT DOCUMENTS

| | | | |
|---|---|---|---|
| 5,631,935 A * | 5/1997 | Ginossar | H04L 47/10 370/232 |
| 6,760,313 B1 * | 7/2004 | Sindhushayana | H04L 1/0002 370/252 |

(Continued)

OTHER PUBLICATIONS

Chang and Liu, "Optimal Channel Probing and Transmission Scheduling for Opportunistic Spectrum Access." IEE/ACM Transaction on Networking, vol. 17, No. 6, Dec. 2009; 14 pages.
(Continued)

*Primary Examiner* — Xavier Szewai Wong
(74) *Attorney, Agent, or Firm* — Fish & Richardson P.C.

(57) ABSTRACT

In general, the subject matter described in this specification can be embodied in methods, systems, and program products for adapting data rate in a communication system. A receiving device receives a data transmission at an initial data rate. The device determines, based on an error rate of the data transmission at the initial data rate, that a first criterion is satisfied for requesting an increase in the data transmission. The device requests that a transmitting device increase the data transmission from the initial data rate to the first subsequent data rate. The device determines, based on an error rate of the data transmission at the first subsequent data rate, whether a second criterion is satisfied for maintaining the first subsequent data rate. The device maintains, if the second criterion is determined to be satisfied, a state of the device for receiving the data transmission at the first subsequent data rate.

20 Claims, 7 Drawing Sheets

Receiving Device State Diagram

Related U.S. Application Data continuation of application No. 13/250,750, filed on Sep. 30, 2011, now Pat. No. 8,203,940, which is a continuation of application No. 13/033,356, filed on Feb. 23, 2011, now Pat. No. 8,565,081.

(51) Int. Cl.
  *H04W 28/04* (2009.01)
  *H04L 1/00* (2006.01)
  *H04L 12/825* (2013.01)
  *H04L 12/801* (2013.01)

(52) U.S. Cl.
  CPC ......... *H04W 24/08* (2013.01); *H04W 28/048* (2013.01); *H04L 47/10* (2013.01)

(56) References Cited

U.S. PATENT DOCUMENTS

| | | | |
|---|---|---|---|
| 7,058,367 B1* | 6/2006 | Luo | H04B 7/0669 375/267 |
| 7,269,139 B1 | 9/2007 | Williams et al. | |
| 7,346,355 B2* | 3/2008 | Wang | H04L 1/0002 370/252 |
| 7,515,538 B2 | 4/2009 | Gefflaut et al. | |
| 7,586,655 B1 | 9/2009 | Uhlik et al. | |
| 7,605,844 B1 | 10/2009 | Page et al. | |
| 7,619,784 B1 | 11/2009 | O'Sullivan et al. | |
| 7,639,406 B1 | 12/2009 | Proudfoot et al. | |
| 8,203,940 B1* | 6/2012 | Yuan et al. | 370/229 |
| 8,520,728 B2* | 8/2013 | Gao | H04N 21/4122 375/240.02 |
| 8,559,455 B1 | 10/2013 | Yuan et al. | |
| 8,565,081 B1* | 10/2013 | Yuan et al. | 370/230 |
| 9,077,486 B1* | 7/2015 | Yuan et al. | |
| 2002/0065063 A1 | 5/2002 | Uhlik et al. | |
| 2002/0114287 A1 | 8/2002 | Gupta et al. | |
| 2002/0147019 A1 | 10/2002 | Uhlik et al. | |
| 2002/0155818 A1 | 10/2002 | Boros et al. | |
| 2002/0183039 A1* | 12/2002 | Padgett | H04W 4/00 455/406 |
| 2003/0026220 A1 | 2/2003 | Uhlik et al. | |
| 2003/0028649 A1 | 2/2003 | Uhlik et al. | |
| 2003/0032423 A1 | 2/2003 | Boros et al. | |
| 2003/0050016 A1 | 3/2003 | Boros et al. | |
| 2003/0086371 A1 | 5/2003 | Walton et al. | |
| 2003/0118107 A1 | 6/2003 | Itakura et al. | |
| 2003/0169722 A1 | 9/2003 | Petrus et al. | |
| 2003/0202485 A1 | 10/2003 | Mansfield | |
| 2004/0062211 A1 | 4/2004 | Uhlik | |
| 2004/0062226 A1 | 4/2004 | Uhlik | |
| 2004/0062276 A1 | 4/2004 | Uhlik et al. | |
| 2004/0063450 A1 | 4/2004 | Uhlik | |
| 2004/0063465 A1 | 4/2004 | Uhlik | |
| 2004/0127260 A1 | 7/2004 | Boros et al. | |
| 2004/0131028 A1 | 7/2004 | Schiff et al. | |
| 2004/0264699 A1 | 12/2004 | Meandzija et al. | |
| 2004/0268126 A1 | 12/2004 | Dogan et al. | |
| 2005/0073960 A1* | 4/2005 | Oura et al. | 370/252 |
| 2005/0113106 A1* | 5/2005 | Duan et al. | 455/452.2 |
| 2005/0169178 A1 | 8/2005 | Gupta et al. | |
| 2006/0125782 A1 | 6/2006 | Orchard et al. | |
| 2006/0215561 A1* | 9/2006 | Wang et al. | 370/235 |
| 2006/0221847 A1 | 10/2006 | Dacosta | |
| 2007/0021930 A1 | 1/2007 | Uhlik | |
| 2007/0042752 A1 | 2/2007 | Uhlik et al. | |
| 2007/0042753 A1 | 2/2007 | Uhlik et al. | |
| 2007/0049299 A1 | 3/2007 | Uhlik | |
| 2007/0112948 A1 | 5/2007 | Uhlik | |
| 2007/0121849 A1 | 5/2007 | Uhlik et al. | |
| 2007/0133496 A1 | 6/2007 | Barratt et al. | |
| 2007/0153010 A1 | 7/2007 | Uhlik | |
| 2007/0294395 A1 | 12/2007 | Strub et al. | |
| 2009/0190561 A1* | 7/2009 | Yokoyama | H04L 1/002 370/335 |
| 2010/0098030 A1* | 4/2010 | Wang | H04B 7/0426 370/335 |
| 2011/0235516 A1 | 9/2011 | Roy et al. | |
| 2011/0273985 A1 | 11/2011 | Siemens et al. | |
| 2013/0028088 A1 | 1/2013 | Do et al. | |
| 2014/0036702 A1 | 2/2014 | Van Wyk et al. | |

OTHER PUBLICATIONS

Chiang et al., "Power Control in Wireless Cellular Networks", Foundations and Trends® in Networking Sample, vol. X Issue Y, 2008, 168 pages.

Sadeghi et al., "Opportunistic Media Access for Multirate Ad Hoc Networks." ACM MobiCom, Atlanta, GA, Sep. 2002; 12 pages.

Tan et al., "Solving Nonconvex Power Control Problems in Wireless Networks: Low SIR Regime and Distributed Algorithms", Department of Electrical Engineering, Princeton University, 2005, 7 pages.

Wong et al., "Robust Rate Adaptation for 802.11 Wireless Networks." ACM MobiCom, 2006; 12 pages.

\* cited by examiner

RATE ADAPTATION IN A COMMUNICATION SYSTEM

CROSS-REFERENCE TO RELATED APPLICATIONS

This application is a continuation of and claims priority under 35 U.S.C. §120 to U.S. application Ser. No. 14/048,242, filed on Oct. 8, 2013, which claims priority to U.S. application Ser. No. 13/250,750, filed on Sep. 30, 2011, which claims priority to U.S. application Ser. No. 13/033,356, filed on Feb. 23, 2011, the entire contents of which is hereby incorporated by reference.

TECHNICAL FIELD

This document generally relates to communication systems.

BACKGROUND

Modern wireless data communication systems provide bandwidth for use by rich computing applications on mobile devices. For example, users of wireless devices such as smart phones can make telephone calls, receive emails, and even receive full-motion audio/video broadcasts on their mobile devices. Every time a great new service is offered, users of wireless devices consume data associated with the service, requiring more and more bandwidth. As a result, the airwaves are filled with data going to and from an increasing number of wireless computing devices that each require growing amounts of data.

A data packet transmitted in a wireless communication system may not always be received by a designated recipient computing device. Interfering signals from other computing devices or from natural phenomena may overpower the portion of the signal that includes the data packet so that the entire data packet, or portions thereof, are unintelligible to the receiving device or include errors. Similarly, the transmitting device or the receiving device may move behind an obstruction, so that communication signals between the devices are inhibited for a temporary period of time.

The electromagnetic spectrum that wireless devices use for wireless communication is treated as a precious resource. Governments control where in the spectrum particular wireless technologies can operate, and also control who can use particular portions of the spectrum (e.g., through high-cost spectrum auctions). Thus, various mechanisms are used to maximize the data that a network of wireless devices and corresponding base stations can exchange in a particular portion of spectrum. Interfering signals may provide fewer errors at reduced data rates than at higher data rates. Accordingly, a communication system may transmit at higher data rates when less interference is detected, and at lower data rates when more interference is detected.

SUMMARY

This document describes techniques, methods, systems, and mechanisms for performing rate adaptation in a communication system. In general, a receiving device in a communication system may control, at least in part, the rate at which a sending device transmits data to the receiving device. The receiving device may analyze a quality of the data communication, for example, by calculating an error rate that is based on the receiving device's success in decoding data packets in the data transmission.

If the error rate is low, the receiving device may request that the sending device increase its data rate of transmission. In response, the sending device may transmit at a higher data rate for a temporary probing period. During this probing period, the receiving device may analyze a quality of the data transmission. If the data transmission at the higher data rate is of acceptable quality, the receiving device may permit the data transmission to continue at the higher data rate. If the data transmission at the higher data rate is of poor quality, the receiving device may request that the sending device enter a state for reducing the data rate of transmission.

In other situations, the receiving device may request that the sending device reduce its data rate of transmission if the error rate is high. In response, the receiving device may await a transmission at the lower data rate. If the receiving device receives a transmission at the lower data rate, the receiving device may permit the data transmission to continue at the lower data rate. If the receiving device does not receive a data transmission at the lower data rate, the receiving device may request that the sending device transmit at yet a more reduced data rate.

In general, one aspect of the subject matter described in this specification can be embodied in a computer-implemented method for adapting data rate in a communication system. The method includes receiving, by a receiving computing device, a data transmission that a transmitting computing device is transmitting at an initial data rate. The method includes determining, by the receiving computing device and based on an error rate of the data transmission at the initial data rate, that a first criterion is satisfied for requesting an increase in the data transmission from the initial data rate to a first subsequent data rate, the first subsequent data rate being a higher data rate than the initial data rate. The method includes requesting, by the receiving computing device, that the transmitting computing device increase the data transmission from the initial data rate to the first subsequent data rate. The method includes determining, by the receiving computing device and based on an error rate of the data transmission at the first subsequent data rate, whether a second criterion is satisfied for maintaining the first subsequent data rate. The method includes maintaining, by the receiving computing device if the second criterion is determined to be satisfied, a state of the receiving computing device for receiving the data transmission at the first subsequent data rate.

Additional aspects can optionally include one or more of the following features. The method can include requesting, by the receiving computing device if the second criterion is not determined to be satisfied, that the transmitting computing device increase the data transmission from the first subsequent data rate to the initial data rate. The method can include determining, by the receiving computing device, the error rate of the data transmission at the initial data rate. Determining the error rate of the data transmission at the initial data rate may include calculating a weighted moving average of the error rate. Determining that the first criterion is satisfied based on the error rate of the data transmission at the initial data rate may include determining that a packet error rate of the data transmission is below a first threshold level. Determining that the first criterion is satisfied based on the error rate of the data transmission may further include determining that a bit error rate of those packets that are not determined to be in error is below a second threshold level.

Another aspect of the subject matter described in this specification can be embodied in a computer-implemented method for adapting data rate in a communication system.

The method includes receiving, by a receiving computing device, a data transmission that a transmitting computing device is transmitting at an initial data rate. The method includes determining, by the receiving computing device and based on an error rate of the data transmission at the initial data rate, that a first criterion is satisfied for requesting a decrease in the data transmission from the initial data rate to a first subsequent data rate, the first subsequent data rate being a lower data rate than the initial data rate. The method includes requesting, by the receiving computing device, that the transmitting computing device decrease the data transmission from the initial data rate to the first subsequent data rate. The method includes determining, by the receiving computing device after requesting the increase from the initial data rate to the first subsequent data rate, whether the data transmission is transmitting at the first subsequent data rate. The method includes maintaining, by the receiving computing device if the data transmission is determined to be transmitting at the first subsequent data rate, a state of the receiving computing device for receiving the data transmission at the first subsequent data rate.

Additional aspects can optionally include one or more of the following features. The method can include requesting, by the receiving computing device if the data transmission is determined to not be transmitting at the first subsequent data rate, that the transmitting computing device decrease the data transmission from the first subsequent data rate to a second subsequent data rate, the second subsequent data rate being a lower data rate than the first subsequent data rate. The receiving computing device may request that the transmitting computing device decrease the data transmission from the first subsequent data rate to the second subsequent data rate if the data transmission is determined to remain transmitting at the initial data rate. Requesting that the transmitting computing device decrease the data transmission from the initial data rate to the first subsequent data rate may include transmitting by the receiving computing device to the transmitting computing device a request at the first subsequent data rate.

In yet another aspect, the subject matter described in this specification can be embodied in a computing system. The system includes a rate change determiner, at a receiver device, to determine, based on an error rate of a data transmission received at the receiver device from a transmitter device, whether the data transmission satisfies criterion for increasing in data rate, criterion for decreasing in data rate, or criterion for maintaining an initial data rate. The system includes a rate change requestor, at the receiver device, to send a request to the transmitter device to increase the data rate of the data transmission if the data transmission meets the criterion for increasing in data rate, and to send a request to the transmitter device to decrease the data rate of the data transmission if the data transmission meets the criterion for decreasing in data rate. The system includes a state transitioner, at the receiver device, to determine: (i) whether the data transmission should remain at the increased data rate by determining, based on an error rate of the data transmission at the increased data rate, whether a criterion is satisfied for maintaining the increased data rate, and (ii) whether the data transmission should remain at the decreased data rate by determining whether the data transmission is transmitting at the decreased data rate.

Additional aspects can optionally include one or more of the following features. The state transitioner can be programmed to maintain a state for receiving the data transmission at the increased data rate if the criterion for maintaining the increased data rate is determined to be satisfied. The state transitioner can be programmed to request that the rate change requestor send a request that the transmitter device decrease the data transmission to the initial data rate if the criterion for maintaining the increased data rate is not determined to be satisfied. The state transitioner can be programmed to maintain a state for receiving the data transmission at the decreased data rate if the data transmission is determined to transmit at the decreased rate. The state transitioner can be programmed to request that the rate change requestor send a request that the transmitter device decrease the data transmission to an even more decreased rate if the data transmission is not determined to transmit at the decreased data rate. The criterion for increasing the data rate may include the error rate of data transmission being beneath a determined error rate. The criterion for decreasing the data rate may be satisfied by estimating that a throughput of data at the decreased data rate is greater than a throughput of data at the increased data rate. The system may include a throughput trainer to store changes in throughput of data and an associated error rate at the initial data rate if the rate change requestor requests a decrease from the initial data rate to the decreased data rate. The rate change determiner may access the stored changes in throughput of data in order to estimate that the throughput of data at the decreased data rate is greater than the throughput of data at the increased data rate.

Particular embodiments can be implemented, in certain instances, to realize one or more of the following advantages. For example, a receiving device in a communication system may be able to control the rate at which data is transmitted to the receiving device. The receiving device may make rate adaptation determinations computationally efficiently and quickly using minimal information (e.g., recent packet error rate). Thus, the receiving device may perform frequent rate adaptation change requests, and the communication system may dynamically change to channel conditions. For example, if the channel deteriorates, the receiving device is able to request that data is transmitted at a lower rate. As a result, the system may maximize the rate at which data can be transmitted, consistent with varying environmental conditions that affect the allowable rate of data transmission.

The details of one or more embodiments are set forth in the accompanying drawings and the description below. Other features, objects, and advantages will be apparent from the description and drawings, and from the claims.

DETAILED DESCRIPTION

Figure 1:
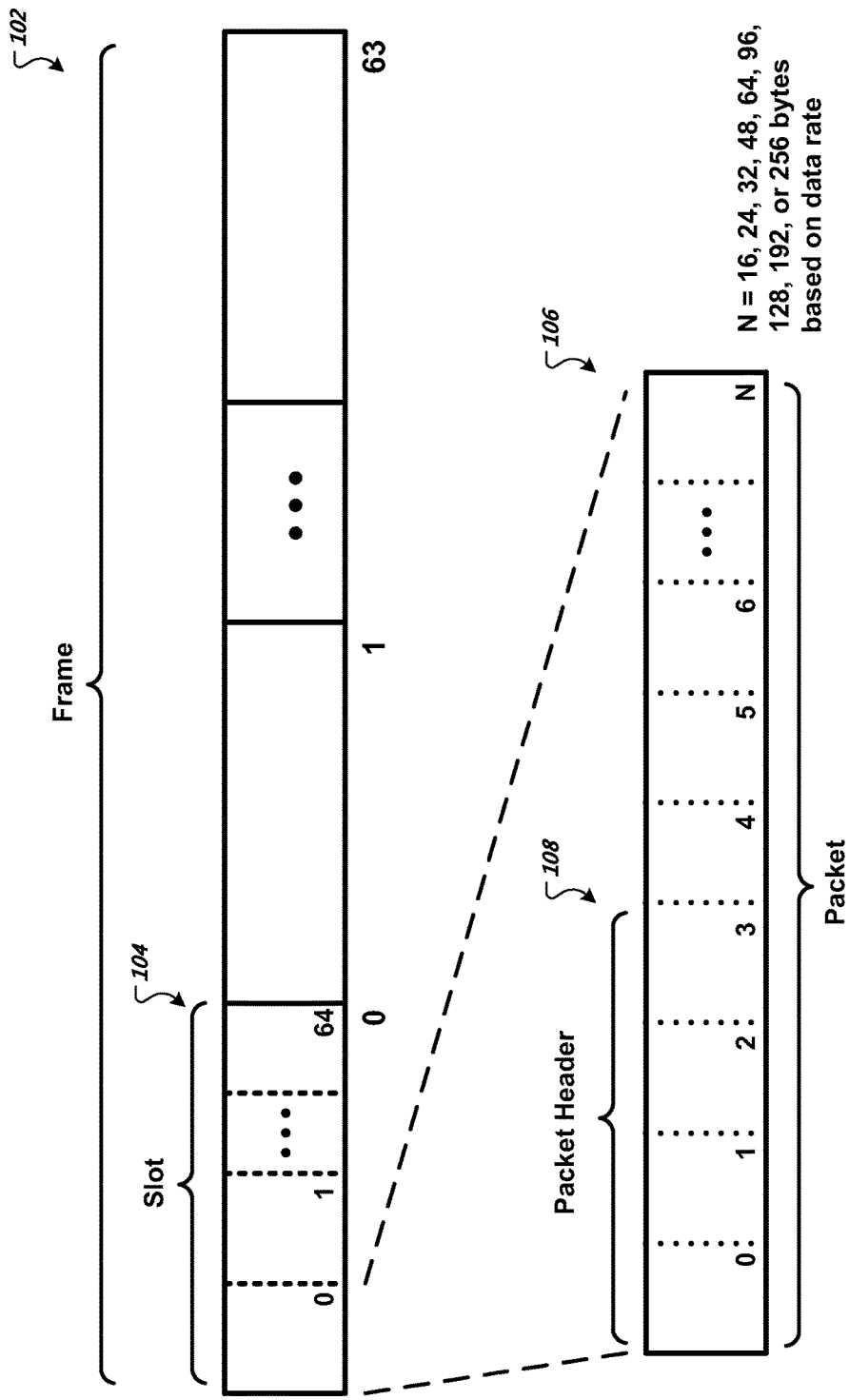
FIG. 1 shows structures for transmitting data in a communication system.

This document generally describes rate adaptation in a communication system. In general, a sending computing device in the communication system may transmit data to a receiving computing device in the communication system. The data transmission may occur at a particular data rate (e.g., a rate at which data is transmitted by the sending computing device into a medium for receipt by the receiving computing device).

The sending computing device may be configured to send the data at different data rates based on a recent data rate request by the receiving computing device. For example, if the receiving computing device is receiving data that includes a significant amount of errors, the receiving computing device may request that the sending computing device transmit at a reduced data rate. At the reduced data rate, each portion of data may transmit for a longer period of time (the switching may be slower). Thus, interference from third-party communications and natural phenomena may be less likely to introduce errors into each portion of data.

Similarly, if the receiving computing device is receiving data that does not include many errors, the receiving computing device may request that the sending computing device transmit the data at an increased data rate. At the increased data rate, each portion of data may transmit for a shorter period of time. Thus, interference may be more likely to introduce errors into each portion of data. The data, however, is transmitted at a higher data rate. As such, the total throughput of data that is received without error (e.g., including data that the receiving computing device is able to decode, even if the data as received includes an error), may be greater at the increased data rate.

After the receiving computing device requests that data be transmitted at an increased data rate, the receiving and sending computing devices may perform a probing operation. For example, the sending computing device may begin transmitting data to the receiving computing device at the increased data rate. The receiving computing device may determine the error rate of the data that is transmitted at the increased data rate. If the error rate is acceptable, the receiving computing device may maintain the transmission of data at the increased data rate (e.g., either by sending a command to continue the data transmission at the increased data rate, or by not sending a command to revert back to the original data rate). If the error rate is not acceptable at the increased data rate, the receiving computing device may let the transmission of data change back to the original data rate (e.g., either by sending a command to revert back to the original data rate, or by not sending a command to continue the data transmission at the increased data rate).

After the receiving computing device requests that data be transmitted at a reduced rate (e.g., in response to a failed attempt to increase the data rate, or in response to determining that total throughput of data may increase at a lower data rate), the receiving computing device determines if it has received data that is transmitted at the reduced rate. If the receiving computing device receives data that is transmitted at the reduced state, the receiving computing device may transition back to an original state for determining whether the data rate should stay the same, increase, or decrease. If the device receives data that is not transmitted at the reduced state (e.g., no data is received or the data is received at a data rate that is not the reduced data rate), the receiving computing device may send a request to decrease the data rate to an even lower data rate. Thus, the receiving computing device may continue to step down in data rate requests until the receiving computing device receives a transmission at the requested data rate. Such a process can ensure that data communication is quickly established if signal condition abruptly deteriorates.

FIG. 1 shows structures for transmitting data in a communication system. In particular, the communication system may use Time Division Multiple Access (TDMA). TDMA may allow multiple devices to share a same frequency channel by dividing the transmission of data into different time slots. Each set of receiving and transmitting devices may be assigned one or more slots in a frame of time. For example, a single base station may communicate with sixty-four mobile devices over a period of time, where each mobile device is assigned a slot during which to communicate with the base station. The frame of time may be a repeating structure so that each mobile device communicates at a regular, repeating interval.

A single frame 102 is illustrated in FIG. 1. The frame is divided into sixty-four slots (e.g., slots 0 through 63). Each slot (e.g., slot 104) is divided into sixty-four packets. Thirty-two of the packets may be for up-link transmission from a mobile computing device to a base station, and thirty-two of the packets may be for down-link transmission from the base station to the mobile computing device. In some examples, each packet time is approximately 17 microseconds, which yields a slot time of approximately 1.08 milliseconds.

The communication system may support multiple transmission rates at the physical layer. For example, a sending computing device may transmit at 16, 24, 32, 48, 64, 96, 128, 192, and 256 bytes per packet. For example, the packet 106 may be divided into a quantity (N) of bytes based on the transmission rate. While the quantity of bytes may change, the time period of packet transmission may remain the same (e.g., approximately 17 microseconds). Each packet may include a same-sized packet header 108 (e.g., a MAC packet header), regardless of the packet length. Therefore, the effective size of data that is transmitted may be the bytes per packet minus the header size.

For examples in which multiple devices are communicating during different slots, at least some of the multiple devices may transmit at different data rates. For example, a first mobile device may receive data at 64 bytes per packet, a second mobile device may receive data at 192 bytes per packet, and a third mobile device may receive data at 24 bytes per packet. The different data transmission rates may correspond to different channel conditions between the mobile devices and a base station.

Figure 2:
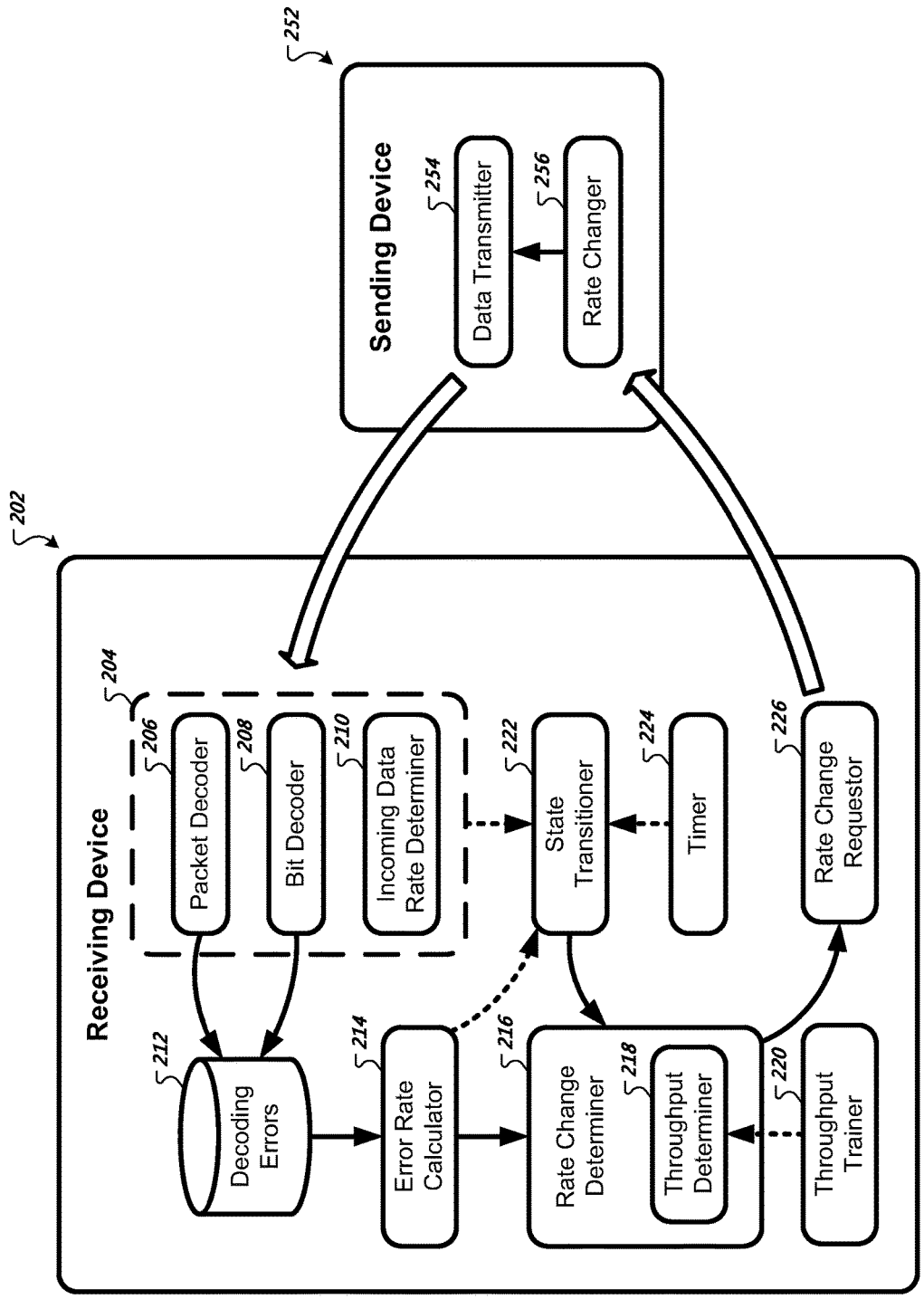
FIG. 2 shows an example system for adapting data rate in a communication system.

FIG. 2 shows an example system for adapting data rate in a communication system. The system includes a receiving computing device 202 and a sending computing device 252. As described above, the receiving device 202 may receive an ongoing transmission of data from the sending device 252, and may request that the sending device 252 transmit the data at a different data rate, for example, based on a determined level of errors in the received data.

In greater detail, the transmission interface 204 receives data that is transmitted from the sending device 252. The incoming data rate determiner 210 can determine a rate of the data transmission. For example, the determined data rate may be 16, 24, 32, 48, 64, 96, 128, 192, or 256 bytes per packet. The data rate may be different than the modulation rate, which may identify a number of waveform changes or signaling events per second. This difference may occur because a single byte or a portion of a byte (e.g., a bit) may be composed of multiple waveform changes or signaling events. In some examples, the transmission interface 204 may be referred to as a receiver 204.

The packet decoder 206 and the bit decoder 208 may receive the incoming data, may determine if the incoming data includes errors, may fix errors when possible, and may store indications of the errors in the decoding errors data storage 212. For example, the packet decoder 206 may attempt to decode an incoming packet. In some examples the packet cannot be decoded and in some examples the packet can be decoded. In examples where the packet can be decoded, a bit decoding process may be performed on the packet. The decoding process may employ forward error correction, a process in which the sending device 252 adds systematically generated redundant data to its data transmissions. The redundancy may allow the receiving device 202 to detect and correct a limited number of errors in the packet. In some examples, the forward error correction process that is used is a low-density parity-check (LDPC).

In some examples, the decoding process includes retrieving a checksum that is included in the packet (e.g., a hash value that is used to detect accidental changes to data in the packet). If the checksum and a hash of the packet are inconsistent, the receiving computing system may determine that the packet is erroneous. In some examples, the receiving device 202 detects an error in a packet if the packet decoder 206 detects an abnormality in the received packet (e.g., an absence of a signaling event or a spike in voltage).

The indications of decoding errors that are stored in the decoding errors data storage 212 may be used to generate an error rate, and the error rate may be used to determine whether or not the receiving device 202 should request a change in the data rate of transmission. Specifically, the error rate calculator 214 may determine an error rate based on a moving average of the data in the data storage 212. The determination of the error rate is described in more detail with reference to FIG. 3.

Figure 3:
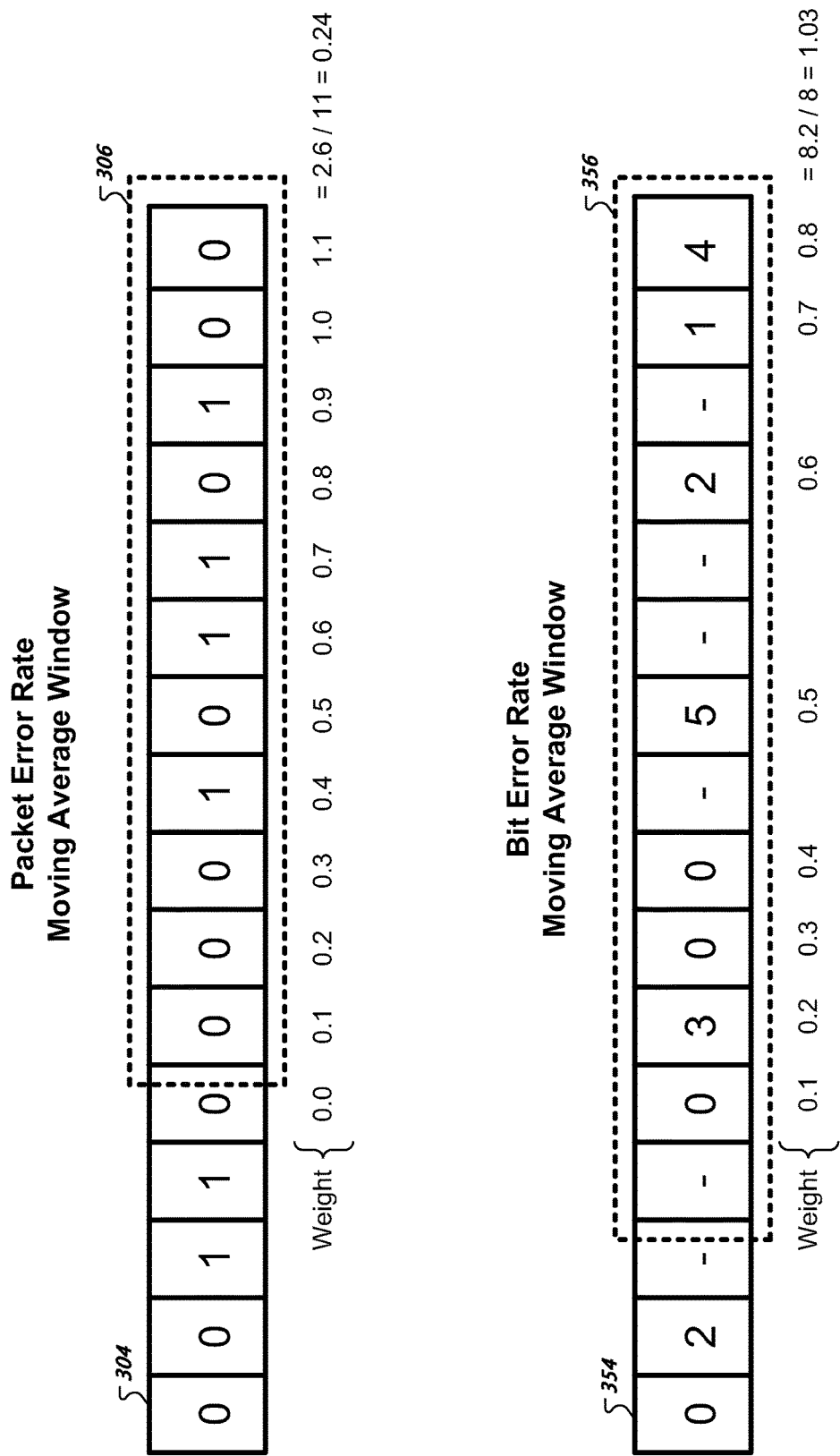
FIG. 3 shows moving average windows that are used to calculate a packet error rate and a bit error rate.

FIG. 3 shows moving average windows that are used to calculate a packet error rate and a bit error rate. In this illustration, array 304 includes, for each of multiple packets, an indication whether the packet decoder 206 could decode the packet (a "0" indicates that the packet could be decoded, while a "1" indicates that the packet could not be decoded).

The packet error rate may be calculated by the error rate calculator 214 using a moving average window. As such, an error rate of the most recent twelve packets that are received at the receiving device 202 may be averaged. In this example, the packet error rate is determined using a weighted moving average window 306. Thus, errors in more recent packets are weighted more heavily than errors in older packets. This is illustrated in the figure as the most-recent packet in the window 306 being provided a weight of 1.1 and the least-recent packet in the window 306 being provided a weight of 0.1. Thus, the overall weighted moving average packet error rate is a 0.24.

In this illustration, array 354 includes, for each of multiple packets, an indication of a number of bits that were incorrect in packets that could be decoded. The bit error rate may be determined by the error rate calculator 214 using a weighted moving average window 356. In this example, the overall weighted moving average bit error rate is 1.03.

Returning to the system that is shown in FIG. 2, the rate change determiner 216 determines whether or not to request a change in the data rate of the present data transmission. For example, the rate change determiner 216 may determine whether an initial data rate should be changed to a subsequent data rate (e.g., a data rate that is higher than the initial data rate or a data rate that is lower than the initial data rate).

The rate change determiner 216 may determine whether the data transmission meets criterion for transmission at a higher data rate. The criterion may include the current packet error rate being below a threshold packet error rate value. In some examples, if the current packet error rate is below the threshold packet error rate value, the criterion may further include the current bit error rate being below a threshold bit error rate value. The threshold packet error rate value and the threshold bit error rate value may have different values for different data rates.

The rate change determiner 216 may determine whether the data transmission meets criterion for transmission at a lower data rate. In some examples, the criterion may include the current packet error rate being above a threshold packet error rate. In some examples, the throughput determiner 218 estimates whether a lower data rate may result in a higher throughput of data. A lower data rate may correspond to a transmission of less source data, however, interference may cause less errors in the source data and thus more data may be throughput in the communication system. In some examples, throughput may be calculated using the current data rate of transmission and the one or more error rates.

The throughput determiner 218 may use historic data from the throughput trainer 220 to estimate whether the lower data rate may result in a higher throughput of data. For example, every time that the rate change determiner 216 decreases the data rate, the throughput trainer may collect any combination of: (i) the data rate before the decrease, (ii) the throughput of data before the decrease, (iii) the packet error rate before the decrease, (iv) the decreased data rate, (v) the throughput at the decreased data rate, and (vi) the packet error rate at the decreased data rate. The throughput trainer 220 may provide this information to the throughput determiner 218 for use in estimating whether decreasing the data rate when a particular error rate is encountered may result in increased throughput.

In some examples, the rate change determiner 216 uses the throughput determiner 218 to determine whether to increase data rate. For example, the rate change determiner 216 may increase the data rate if the increased data rate is estimated to provide greater data throughput. In some examples, the throughput trainer 220 sets the threshold error rate values at which the rate change determiner 216 may request an increase or a decrease in data rate. The threshold error rate values may be based on historic evidence of data throughput.

Accordingly, the rate change determiner 216 may call on the rate change requestor 226 to request a change in data rate. As such, the rate change requestor 226 may transmit to the sending device 252 a request that the sending device 252 change its data rate of transmission. For example, the request may be transmitted in the MAC header of a packet. In some examples, every MAC header includes a requested data rate of transmission. In other examples, the MAC header periodically includes a requested data rate of transmission (e.g., when the data rate changes).

The rate changer 256 at the sending device 252 receives the request to change the data rate. In response, the rate changer 256 changes the rate of data transmission by the data transmitter 254, which collects data that is to be transmitted and sends the data over a medium (e.g., coaxial cable, Ethernet cable, air, or a combination thereof) to the receiving device 202. The data transmitter 254 may be referred to as a transmitter 254.

Figure 4:
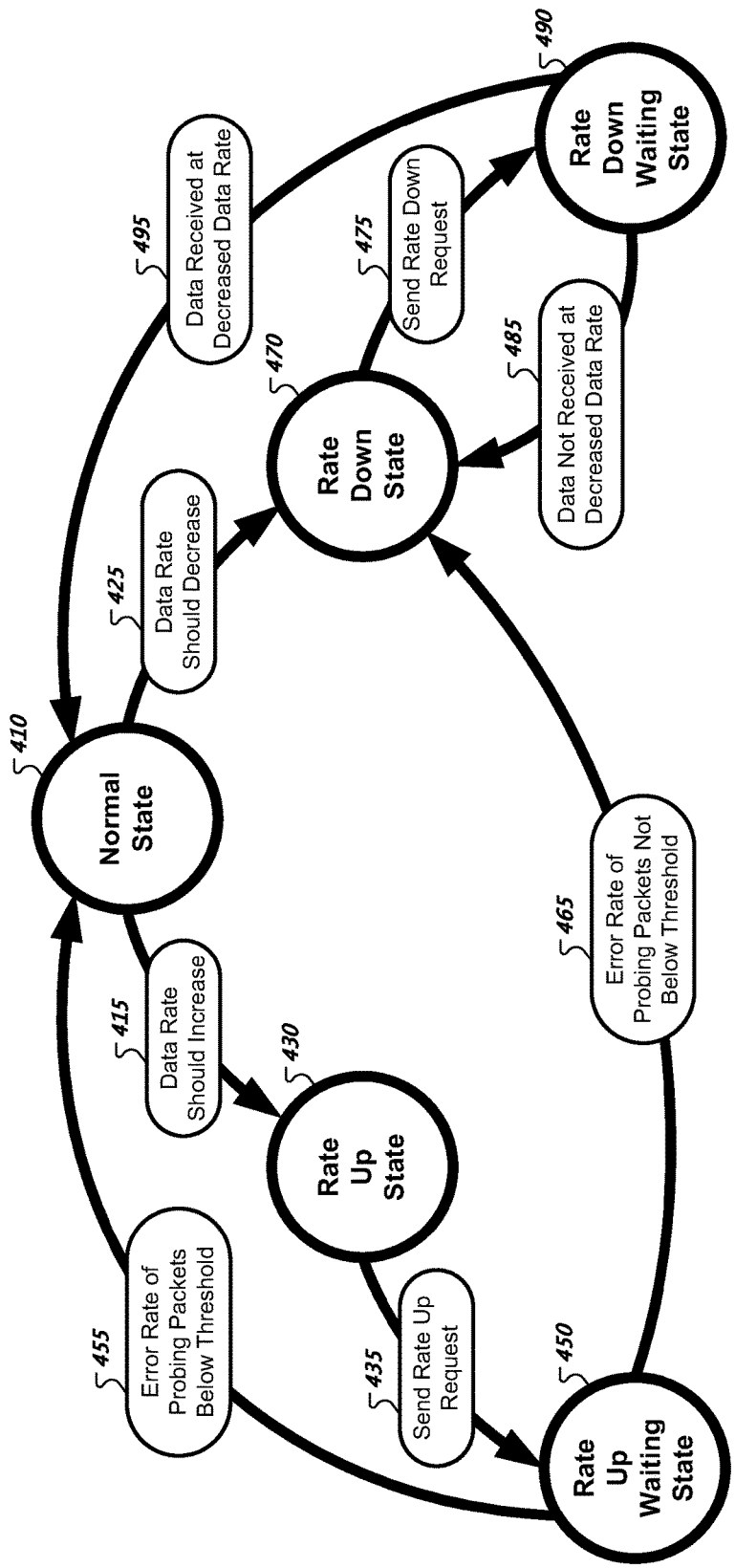
FIG. 4 shows a state diagram for a receiving computing device.

As described in more detail with respect to FIG. 4, after the rate change requestor 226 requests that the sending device 252 transmit at a different data rate, the receiving device 202 may enter a temporary state. In particular, when a request for a data rate increase is transmitted, the receiving device 202 may enter a state to determine whether probing packets that are received at the higher data rate fall below a determined error level. When a request for data rate decrease is transmitted, the receiving device 202 may enter a state to determine whether packets are received at the reduced rate.

The state transitioner 222 performs the determinations whether the receiving device 202 may remain in the temporary states, in part using a timer 224. At the end of a determined time period, the state transitioner 222 may change the state of the receiving device based on the error level of packets at the higher data rate, or whether data is received at the reduced data rate. The operation of the state transitioner 222 is described in more detail with respect to FIG. 5.

FIG. 2 illustrates that the sending device 252 sends data to the receiving device 202. The receiving device 202, however, may also send data to the sending device 252. In such a scenario, the receiving device 202 may include the components 254-256 of the sending device 252, and the sending device 252 may include the components 204-226 of the receiving device 202. Thus, the devices may engage in duplex communication.

FIG. 4 shows a state diagram for a receiving computing device. In this example, the receiving device 202 may transition between states 410, 430, 450, 470, and 490. The transitions between the states are depicted with arrows, and are accompanied by descriptive bubbles 415, 425, 435, 455, 465, 475, 485, and 495. Each descriptive bubble describes a condition that is satisfied for the respective transition to occur or an action that occurs upon the transition.

The receiving device 202 may begin in the Normal State 410 upon powering on. In some examples, if the receiving device 202 has transitioned out of the Normal State 410, the receiving device 202 transitions to the Normal State 410 if network conditions (e.g., error rates) remain substantially constant for an extended period of time (e.g., more than a minute). Thus, the Normal State 410 may be a default state of the receiving device 202. Other states may be temporary states, and the receiving device 202 may not remain in a temporary state for longer than a determined amount of time before the receiving device 202 transitions to another state.

While the receiving device 202 is in the Normal State 410, the rate change determiner 216 may periodically determine whether the error rate satisfies criterion for increasing the data rate or decreasing the data rate, as described with reference to FIG. 2. For example, the rate change determiner 216 may, after every packet is received, calculate whether an updated packet error rate falls below a threshold level or may estimate whether a reduced data rate may increase data throughput. The packet error rate may be determined in a number of manners, and may, for example, include computing an updated error rate over a moving window of recently-received packets.

If the rate change determiner 216 determines that criterion is satisfied for increasing the data rate, then the transition to the Rate Up State 430 may be taken. At the Rate Up State 430, the rate change requestor 226 sends a request to the sending device 252 to increase its data rate of data transmission. In some examples, the request includes an indication of the data rate at which the sending device 252 should transmit. In some examples, the request indicates that the data rate should increase but does not indicate the increased data. For example, requesting, by the receiving device, that the sending device increase the data transmission from an initial data rate to an increased data rate may not include the receiving device transmitting an indication of the increased data rate to the sending device.

Once the request has been sent to the sending device 252, the transition to the Rate Up Waiting State 450 may be taken. While in the Rate Up Waiting State 450, the receiving device 202 may begin to receive packets that the sending device 252 transmits at the increased data rate. The receiving device 202 may receive the packets at the increased data rate for a determined time period before the state transitioner 222 determines whether the data transmission at the increased data rate satisfies criterion for remaining at the increased data rate.

An example criterion includes the packet error rate being below a threshold value. In some examples, if the packet error rate is below the threshold value, the bit error rate must also be below another threshold value for the criterion to be satisfied. If this criterion is satisfied, the transition back to the Normal State 410 is taken. In some examples, the state transitioner 222 checks the error rate or rates upon expiration of the probing time period. In other words, the state transitioner may allow the probing packets to be received for the probing time period before the state transitioner determines whether to maintain the increased data rate or request that the sending device 252 change data transmission to the previous data rate. In various examples, the probing packets include normal data and are not "test" packets, as the communication system may include retransmission mechanisms for data that is not decoded.

Once the receiving device 202 is back at the Normal State 410, it may continue to receive data at the increased data rate (e.g., because the rate change requestor 226 continues to request that the data be transmitted at the increased rate). In other words, if the data that is transmitted at the increased data rate is of high quality, the receiving device 202 continues to request that data transmit at the increased data rate and the receiving device 202 transitions to the Normal State 410 upon expiration of the probing time period.

On the other hand, if the data that is transmitted at the increased data rate is of low quality (e.g., because the criterion is not satisfied), then the receiving device 202 may transition to the Rate Down State 470. As described in more detail below, the Rate Down State 470 may provide a rapid mechanism for transitioning to a reduced data rate. In contrast, if the Rate Up State 340 immediately transitioned back to the Normal State 410, a delay may occur before the Rate Change Determiner 216 determines that the receiving device may transition to the Rate Down State 470. The delay may be longer than the probing time period.

Also, the receiving device 202 may transition from the Normal State 410 to the Rate Down State 470. This transition may occur if the rate change determiner 216 determines that the data rate should decrease. For example, and as described with reference to FIG. 2, the rate change determiner 216 may estimate that the data throughput may increase if the data transmission changes to a reduced data rate, or may determine that the packet error rate has risen above a threshold level.

While in the Rate Down State 470, the rate change requestor 226 at the receiving device 202 may request that the sending device 252 change a data rate of transmission to a reduced data rate (e.g., a data rate that is one step lower than a present data rate). In some examples, the request is transmitted at the reduced data rate. The receiving device 202 may be in the Rate Down State 470 because of deteriorating channel quality, and sending at the reduced data rate may increase chances that the request reaches the sending device 252 (e.g., because the quality of the transmission received by the receiving device may be analogous to a quality of the request that the sending device may receive).

Once the request to decrease the data rate of transmission has been transmitted to the sending device 252, the receiving device 202 transitions to the Rate Down Waiting State 490. While in the Rate Down Waiting State 490, the state transitioner 222 determines if data (e.g., an entire packet or multiple packets) is received at the decreased data rate. If data is received at the decreased data rate, the receiving device 202 may determine that the sending device 252 received the request to decrease the data rate and has acted on the request. Thus, the receiving device 202 may transition to the Normal State 410 and await further determination on the quality of the data transmission.

If the state transitioner 222 determines that data is not received at the decreased data rate within a determined time period, the receiving device 202 may transition to the Rate Down State 470 yet again. This transition may occur because the request to reduce the data rate (or a continuing series of requests) may not have been received by the sending device 252, or because the channel quality has so deteriorated that the receiving device 202 is having difficulty decoding data that is received at the reduced data rate. The receiving device may again transition from the Rate Down State 470 to the Rate Down Waiting State 490, and in doing so may request that the sending device transmit at an even more decreased data rate (e.g., yet another step decrease in data rate).

In some implementations, while the receiving device 202 is in the Rate Down Waiting State 490, the receiving device 202 may additionally or alternatively determine an error rate of a transmission that is received at the reduced data rate. If the receiving device 202 has received data at the reduced data rate, but the error rate exceeds a threshold level or the receiving device determines that more data throughput would occur at an even more decreased data rate, the receiving device 202 may transition back to the Rate Down State 470.

In various examples, the determinations that occur while the receiving device 202 is in the Rate Up Waiting State 450 and the Rate Down Waiting State 490 occur more quickly than determinations while the receiving device 202 is in the Normal State 410. For example, the Normal State 410 may fill the weighted moving average window 306 with data for several hundred packets at a given data rate before determining whether the data rate should increase or decrease. On the other hand, while the receiving device 202 is in the Rate Up Waiting State 450 or the Rate Down Waiting State 490, the receiving device 202 may wait a time period that is the same as the time to receive a dozen packets before transitioning to a new state. This difference in determination time periods may reflect different priorities of the different states, for example, accuracy versus speed.

Figure 5:
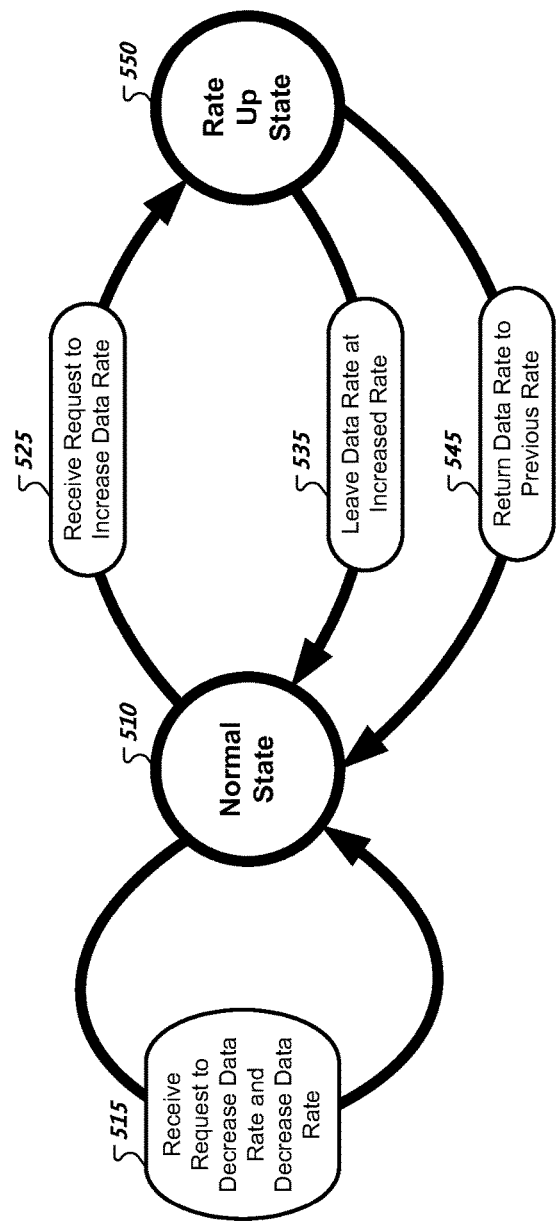
FIG. 5 shows a state diagram for a sending computing device.

FIG. 5 shows a state diagram for a sending computing device. In some examples, the state of the sending device 252 is based on communications from the receiving device 202. For example, the receiving device 202 may request that the sending device change 252 change a data rate of transmission, and the sending device 252 may, in response, change states. In some examples, the sending device 252 may transition to the Normal State 510 if network conditions (e.g., error rates) remain substantially constant for an extended period of time (e.g., more than a minute). Thus, the Normal State 510 may be a default state of the sending device 252. Other states may be temporary states, and the sending device 252 may not remain in a temporary state for longer than a determined amount of time before the receiving device 202 transitions to another state.

While in the Normal State 510, the sending device 252 may receive a request to decrease the data rate of the data transmission (e.g., in response to the receiving device 202 sending a request to decrease the data rate, at descriptive bubble 475). In response, the sending device 252 may perform the action that corresponds to descriptive bubble 515. This action may include decreasing the data rate to the next lowest data rate. The sending device 252 may return back to the Normal State 510 after performing the action.

Further, the sending device 252 may receive a request to increase the data rate of the data transmission (e.g., in response to the receiving device 202 sending a request to increase the data rate, at descriptive bubble 435). In response, the sending device 252 may transition to the Rate Up State 550. At the Rate Up State 550, the sending device 252 may transmit data to the receiving device 202 at the increased data rate. Upon occurrence of an event, the sending device 252 may transition back to the Normal State 510, either leaving the data rate at the increased data rate (descriptive bubble 535) or returning the data rate to the previous data rate (descriptive bubble 545).

In some implementations, the sending device 252 transitions to the Normal State 510 upon expiration of a probing time period. Upon the transition, the sending device 252 may transmit at the data rate that is indicated in a data rate request that is received just prior to the transition.

In some implementations, the sending device 252 returns to the previous data rate if the sending device 252 receives a request to return to the previous data rate. The sending device 252 may leave the data rate at the increased data rate either in response to receiving a request to leave the data rate at the increased data rate, or in response to not receiving a request to return the data rate to the previous data rate within a determined time period.

In some implementations, the sending device 252 returns to the previous data rate if the sending device 252 does not receive a request to return to the previous data rate within a determined time period. The sending device 252 may leave the data rate at the increased data rate if another request to leave the data rate at the increased data rate is received within the determined time period. For example, the receiving device 202 may transmit a first request or series of requests for changing the data rate to the increased data rate. The sending device 252 may then transmit probing packets at the increased data rate while in the Rate Up State 550. If the receiving device 202 sends another request or series of requests after a delay that followed the first request or series of requests, the sending device 252 may transition to the Normal State 510 and may continue to send data at the increased data rate.

Figure 6:
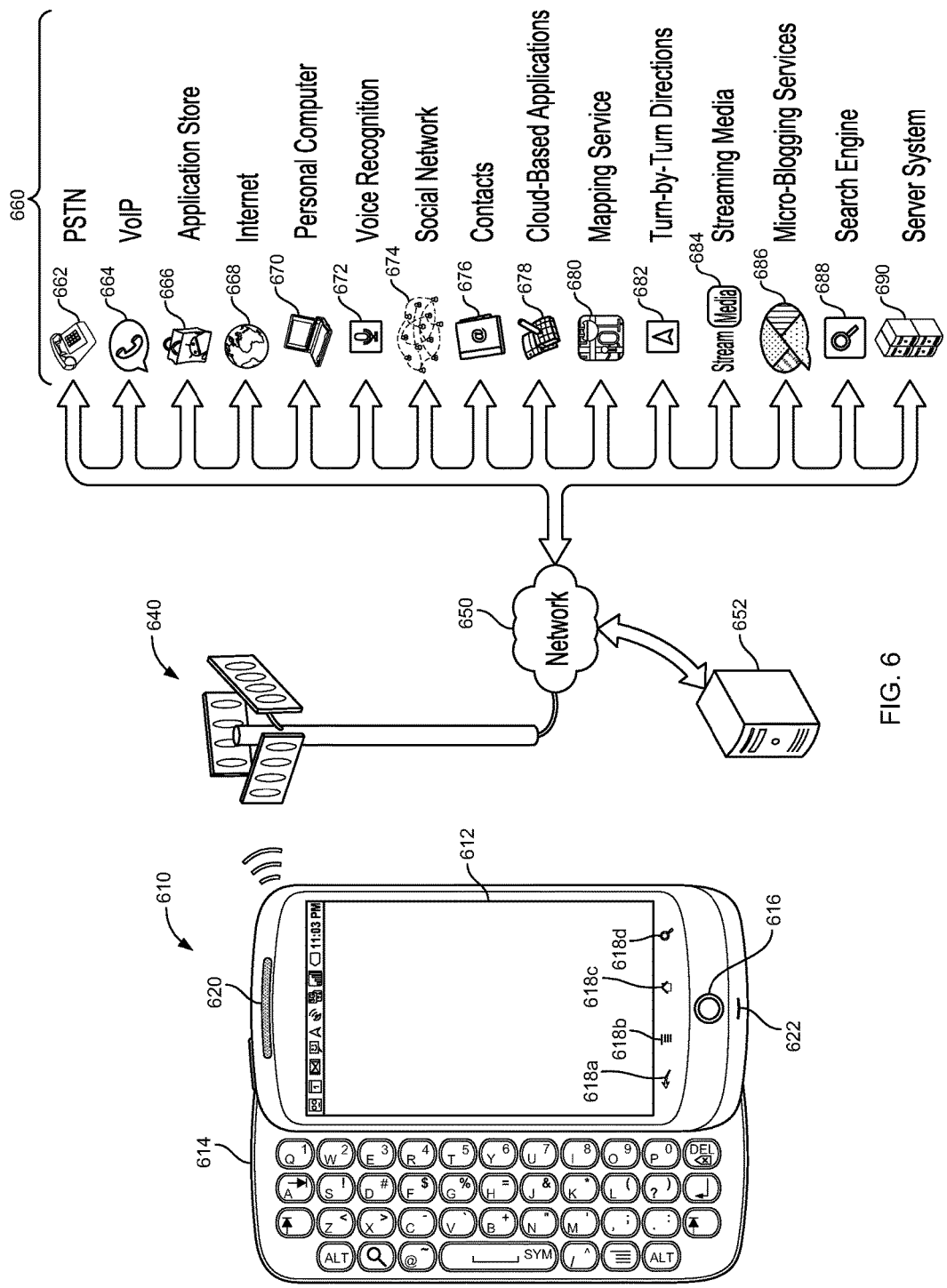
FIG. 6 shows a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device with wireless access to numerous hosted services 660 through a network 650.

In this illustration, the mobile computing device 610 is depicted as a handheld mobile telephone (e.g., a smartphone, or application telephone) that includes a touchscreen display device 612 for presenting content to a user of the mobile computing device 610 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 614, physical buttons, trackballs, accelerometers, gyroscopes, and magnetometers).

Example visual output mechanism in the form of display device 612 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 610. The mobile computing device 610 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a*-*d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user capabilities to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
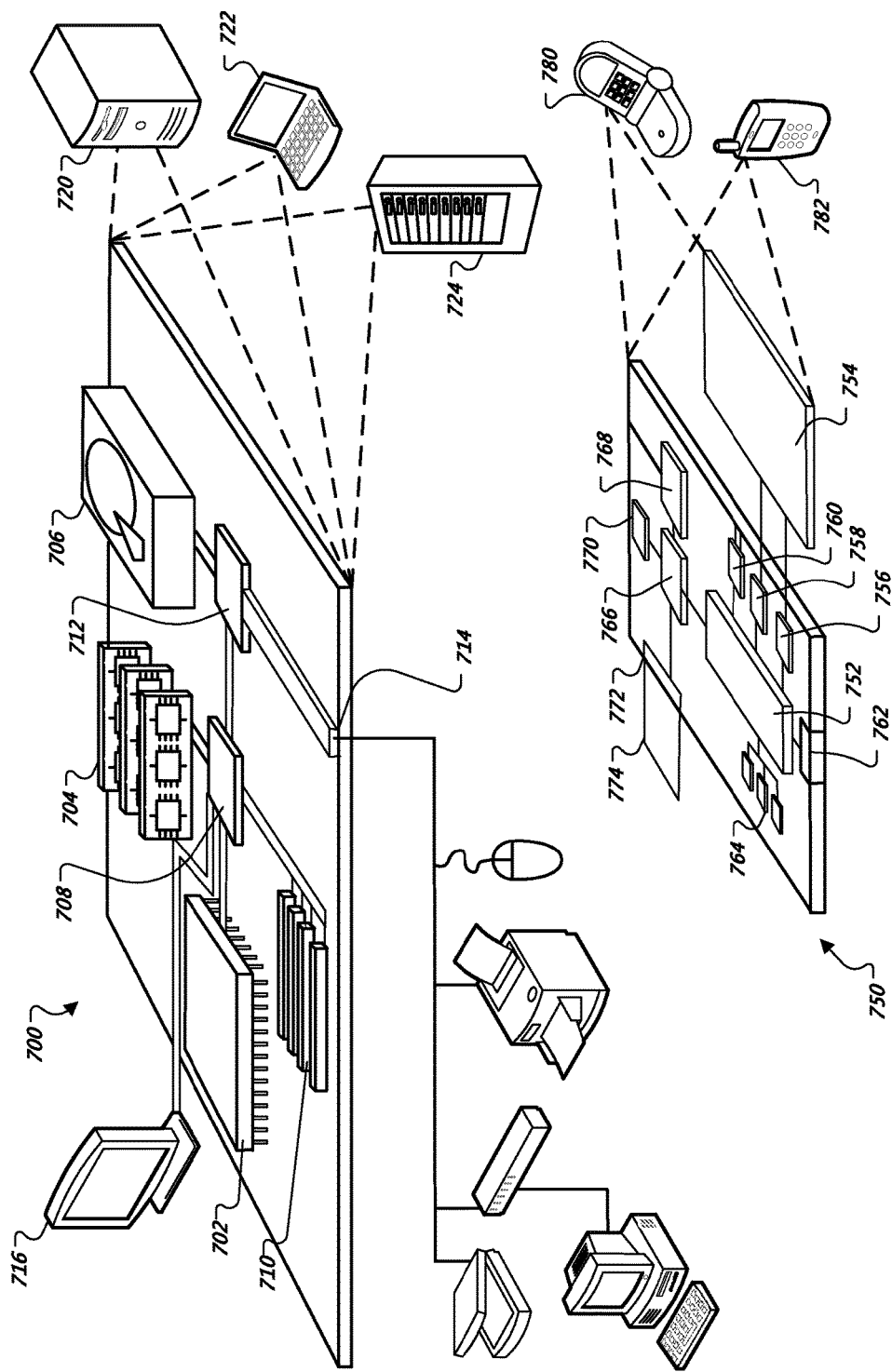
FIG. 7 shows a block diagram of computing devices that may be used to implement the systems and methods described in this document, as either a client or as a server or plurality of servers.

FIG. 7 shows a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 752 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for a receiving computing device to control a data rate at which a transmitting computing device transmits data for receipt by the receiving computing device, the method comprising:
   receiving, by the receiving computing device, a data transmission that the transmitting computing device is transmitting at a first data rate;
   estimating, by the receiving computing device, that the data transmission that is transmitted by the transmitting computing device will provide the receiving computing device with a greater expected throughput of data at a second data rate than a current throughput of data that the data transmission provides the receiving computing device at the first data rate; and
   sending, by the receiving computing device and for receipt by the transmitting computing device in response to the receiving computing device having estimated that the data transmission that is transmitted by the transmitting computing device will provide the receiving computing device with the greater expected throughput of data at the second data rate than the current throughput of data that the data transmission provides the receiving computing device at the first data rate, a request that the transmitting computing device modify the data rate of the data transmission from the first data rate to the second data rate.

2. The computer-implemented method of claim 1, wherein:
   the current throughput of data that the data transmission provides the receiving computing device at the first data rate indicates a quantity of data that the receiving computing device received at the first data rate without error; and
   the expected throughput of data at the second data rate indicates a quantity of data that the receiving computing device is expected to receive at the second data rate without error.

3. The computer-implemented method of claim 1, wherein the second data rate is a lower data rate than the first data rate.

4. The computer-implemented method of claim 3, further comprising:
   determining, by the receiving computing device and after sending the request that the transmitting computing device modify the data rate of the data transmission from the first data rate to the second data rate, whether the data rate of the data transmission is at the second data rate; and
   maintaining, by the receiving computing device as a result of determining that the data rate of the data transmission is at the second data rate, a state of the receiving computing device for receiving the data transmission at the second data rate.

5. The computer-implemented method of claim 3, wherein, as a result of the receiving computing device having determined that the data rate of the data transmission is not at the second data rate after the receiving computing device sent the request that the transmitting computing device modify the data rate of the data transmission from the first data rate to the second data rate, the receiving computing device is configured to send a request that the transmitting computing device decrease the data rate of the data transmission to a third data rate, the third data rate being a lower data rate than the second data rate.

6. The computer-implemented method of claim 5, wherein the receiving computing device is configured to send the request that the transmitting computing device decrease the data rate of the data transmission to the third data rate as a result of the receiving computing device having determined that the data rate of the data transmission remains at the first data rate after the receiving computing device has sent the request that the transmitting computing device modify the data rate of the data transmission from the first data rate to the second data rate.

7. The computer-implemented method of claim 1, wherein estimating that the data transmission that is transmitted by the transmitting computing device will provide the receiving computing device with the greater expected throughput of data at the second data rate includes performing a calculation that is based on the current throughput of data at the first data rate or a current error rate of the data transmission at the first data rate.

8. The computer-implemented method of claim 1, wherein estimating that the data transmission that is transmitted by the transmitting computing device will provide the receiving computing device with the greater expected throughput of data at the second data rate includes accessing data that identifies:
(i) multiple stored throughputs of data or stored error rates at the first data rate, and
(ii) multiple corresponding stored throughputs of data or stored error rates at the second data rate.

9. The computer-implemented method of claim 8, wherein estimating that the data transmission that is transmitted by the transmitting computing device will provide the receiving computing device with the greater expected throughput of data at the second data rate includes:
identifying a stored throughput of data or a stored error rate at the first data rate, from the multiple stored throughputs of data or stored error rates at the first rate, that matches the current throughput of data or a current error rate for the first data rate; and
determining whether the stored throughput of data or stored error rate that is at the second data rate and that corresponds to the identified stored throughput of data or stored error rate results in a throughput of data that is greater than the current throughput of data at the first data rate.

10. The computer-implemented method of claim 8, wherein:
the data that identifies the multiple stored throughputs of data or stored error rates at the first data rate and the multiple corresponding stored throughputs of data or stored error rates at the second data rate is historical data that the receiving computing device recorded as a result of the receiving computing device sending requests that one or more transmitting computing devices modify data rates of data transmissions from the first data rate to the second data rate;
the multiple stored throughputs of data or stored error rates at the first data rate occurred before the respective modifications of the data rates; and
the multiple stored throughputs of data or stored error rates at the second data rate occurred after the respective modifications of the data rates.

11. A non-transitory computer-readable memory including instructions that, when executed by a processor, cause performance of operations for a receiving computing device to control a data rate at which a transmitting computing device transmits data for receipt by the receiving computing device, the operations comprising:
receiving, by the receiving computing device, a data transmission that the transmitting computing device is transmitting at a first data rate;
estimating, by the receiving computing device, that the data transmission that is transmitted by the transmitting computing device will provide the receiving computing device with a greater expected throughput of data at a second data rate than a current throughput of data that the data transmission provides the receiving computing device at the first data rate; and
sending, by the receiving computing device and for receipt by the transmitting computing device in response to the receiving computing device having estimated that the data transmission that is transmitted by the transmitting computing device will provide the receiving computing device with the greater expected throughput of data at the second data rate than the current throughput of data that the data transmission provides the receiving computing device at the first data rate, a request that the transmitting computing device modify the data rate of the data transmission from the first data rate to the second data rate.

12. The non-transitory computer-readable memory of claim 11, wherein:
the current throughput of data that the data transmission provides the receiving computing device at the first data rate indicates a quantity of data that the receiving computing device received at the first data rate without error; and
the expected throughput of data at the second data rate indicates a quantity of data that the receiving computing device is expected to receive at the second data rate without error.

13. The non-transitory computer-readable memory of claim 11, wherein the second data rate is a lower data rate than the first data rate.

14. The non-transitory computer-readable memory of claim 13, wherein the operations further comprise:
determining, by the receiving computing device and after sending the request that the transmitting computing device modify the data rate of the data transmission from the first data rate to the second data rate, whether the data rate of the data transmission is at the second data rate; and
maintaining, by the receiving computing device as a result of determining that the data rate of the data transmission is at the second data rate, a state of the receiving computing device for receiving the data transmission at the second data rate.

15. The non-transitory computer-readable memory of claim 13, wherein, as a result of the receiving computing device having determined that the data rate of the data transmission is not at the second data rate after the receiving computing device sent the request that the transmitting computing device modify the data rate of the data transmission from the first data rate to the second data rate, the receiving computing device is configured to send a request that the transmitting computing device decrease the data rate of the data transmission to a third data rate, the third data rate being a lower data rate than the second data rate.

16. The non-transitory computer-readable memory of claim 15, wherein the receiving computing device is configured to send the request that the transmitting computing device decrease the data rate of the data transmission to the third data rate as a result of the receiving computing device having determined that the data rate of the data transmission remains at the first data rate after the receiving computing device has sent the request that the transmitting computing device modify the data rate of the data transmission from the first data rate to the second data rate.

17. The non-transitory computer-readable memory of claim 11, wherein estimating that the data transmission that is transmitted by the transmitting computing device will provide the receiving computing device with the greater expected throughput of data at the second data rate includes performing a calculation that is based on the current throughput of data at the first data rate or a current error rate of the data transmission at the first data rate.

18. The non-transitory computer-readable memory of claim 11, wherein estimating that the data transmission that is transmitted by the transmitting computing device will provide the receiving computing device with the greater expected throughput of data at the second data rate includes accessing data that identifies:
(i) multiple stored throughputs of data or stored error rates at the first data rate, and (ii) multiple corresponding stored throughputs of data or stored error rates at the second data rate.

19. The non-transitory computer-readable memory of claim 18, wherein estimating that the data transmission that is transmitted by the transmitting computing device will provide the receiving computing device with the greater expected throughput of data at the second data rate includes:
  identifying a stored throughput of data or a stored error rate at the first data rate, from the multiple stored throughputs of data or stored error rates at the first rate, that matches the current throughput of data or a current error rate for the first data rate; and
  determining whether the stored throughput of data or stored error rate that is at the second data rate and that corresponds to the identified stored throughput of data or stored error rate results in a throughput of data that is greater than the current throughput of data at the first data rate.

20. The non-transitory computer-readable memory of claim 18, wherein:
  the data that identifies the multiple stored throughputs of data or stored error rates at the first data rate and the multiple corresponding stored throughputs of data or stored error rates at the second data rate is historical data that the receiving computing device recorded as a result of the receiving computing device sending requests that one or more transmitting computing devices modify data rates of data transmissions from the first data rate to the second data rate;
  the multiple stored throughputs of data or stored error rates at the first data rate occurred before the respective modifications of the data rates; and
  the multiple stored throughputs of data or stored error rates at the second data rate occurred after the respective modifications of the data rates.

* * * * *